United States Patent
Bynum et al.

(10) Patent No.: US 11,115,428 B2
(45) Date of Patent: Sep. 7, 2021

(54) SYSTEMS AND METHODS FOR DETERMINING NETWORK DATA QUALITY AND IDENTIFYING ANOMALOUS NETWORK BEHAVIOR

(71) Applicant: Verizon Patent and Licensing Inc., Arlington, VA (US)

(72) Inventors: Christopher D. Bynum, Denver, CO (US); Scott G. Carter, Denver, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 127 days.

(21) Appl. No.: 16/691,396

(22) Filed: Nov. 21, 2019

(65) Prior Publication Data
US 2021/0160262 A1    May 27, 2021

(51) Int. Cl.
G06F 15/16 (2006.01)
H04L 29/06 (2006.01)
H04L 12/26 (2006.01)
H04L 12/24 (2006.01)

(52) U.S. Cl.
CPC .......... *H04L 63/1425* (2013.01); *H04L 41/14* (2013.01); *H04L 43/04* (2013.01); *H04L 43/067* (2013.01); *H04L 43/16* (2013.01)

(58) Field of Classification Search
USPC ........................................ 709/224, 223, 202
See application file for complete search history.

*Primary Examiner* — Lan Dai T Truong

(57) ABSTRACT

A device receives network data and artificial packets associated with a network, and processes the network data to generate sequential sets of the network data. The device processes the sequential sets of the network data, with a time series model, to generate time series network data, and determines whether the time series network data satisfies a quality threshold. The device transforms, when the time series network data satisfies the quality threshold, residual data in the time series network data to identify data outliers, and removes the data outliers to generate modified time series network data. The device processes the modified time series network data, with a model, to generate a forecast data point, and compares the forecast data point and an actual data point to determine whether an anomaly exists in the network. The device performs one or more actions based on determining whether the anomaly exists in the network.

20 Claims, 13 Drawing Sheets

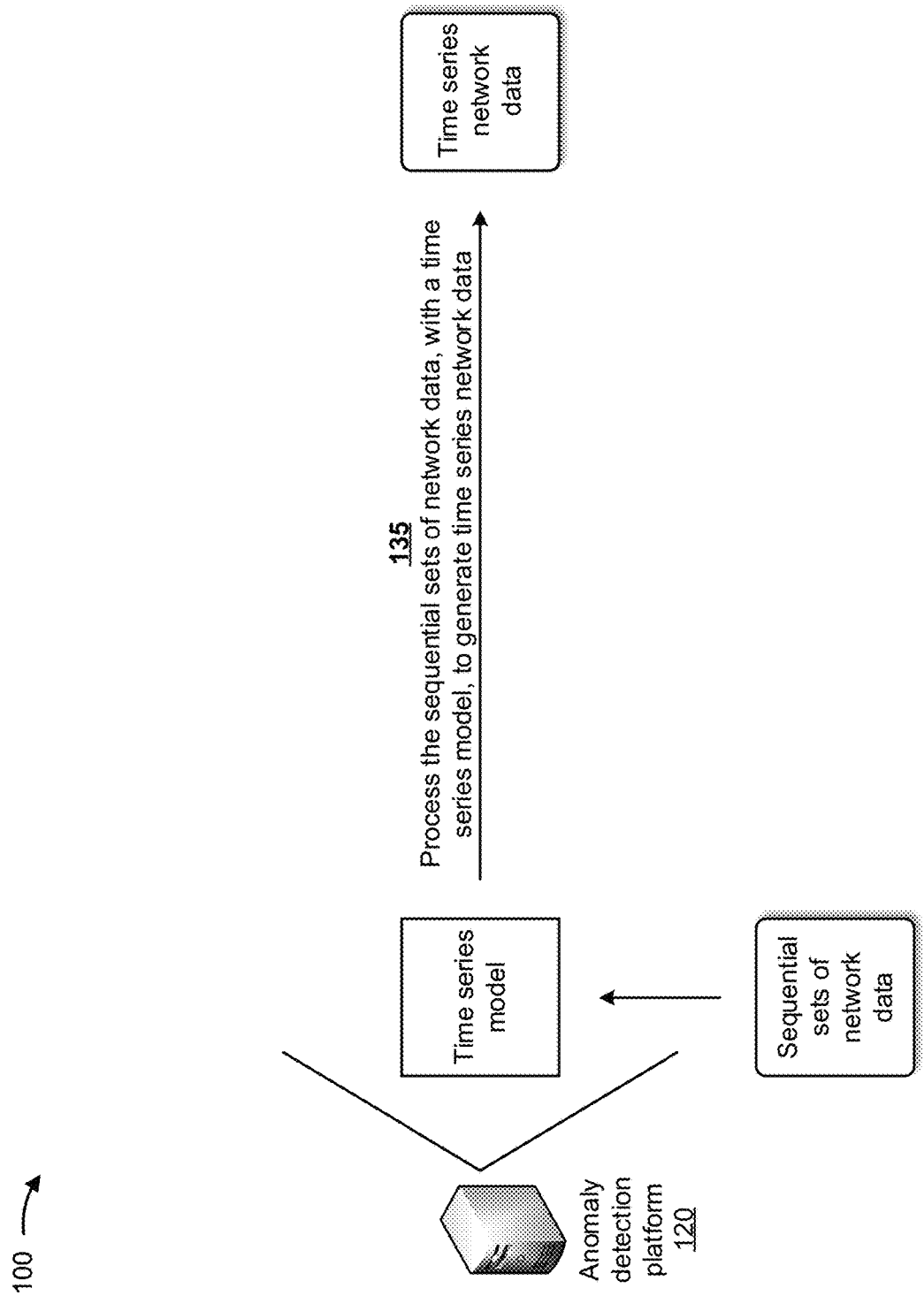

SYSTEMS AND METHODS FOR DETERMINING NETWORK DATA QUALITY AND IDENTIFYING ANOMALOUS NETWORK BEHAVIOR

BACKGROUND

Threat detection and response is about utilizing analytics to identify threats in large and disparate data sets. An objective of threat detection is to identify anomalies, analyze a threat level associated with the anomalies, and determine mitigative actions to perform in response to the threat level. Demand for threat detection and response solutions has grown as a volume of data being produced by organizations is increasing at an exponential rate.

BRIEF DESCRIPTION OF THE DRAWINGS

FIGS. 1A-1J are diagrams of one or more example implementations described herein.

DETAILED DESCRIPTION OF PREFERRED EMBODIMENTS

The following detailed description of example implementations refers to the accompanying drawings. The same reference numbers in different drawings may identify the same or similar elements.

Current threat detection systems may identify anomalous behavior in a network based on network data associated with the network. The anomalous behavior may be utilized to identify a threat to the network. However, if the network data is insufficient or poor in quality, a threat detection system may identify false anomalous behaviors or false threats, may not identify true anomalous behaviors or threats, and/or the like. This may result in waste of computing resources (e.g., processing resources, memory resources, communication resources, and/or the like), networking resources, and/or the like in investigating false anomalous behaviors or false threats, identifying the false anomalous behaviors or threats, handling a network outage due to undiscovered behaviors or threats, and/or the like.

Some implementations described herein provide an anomaly detection platform that determines network data quality and identifies anomalous network behavior. For example, the anomaly detection platform may receive network data associated with a network that includes a plurality of network devices, and may process the network data to generate sequential sets of the network data. The anomaly detection platform may process the sequential sets of the network data, with a time series model, to generate time series network data, and may determine whether the time series network data satisfies a data quality threshold. The anomaly detection platform may transform, when the time series network data satisfies the data quality threshold, residual data in the time series network data to identify data outliers in the time series network data, and may remove the data outliers from the time series network data to generate modified time series network data. The anomaly detection platform may process the modified time series network data, with a model, to generate a forecast data point, and may compare the forecast data point and an actual data point to determine whether an anomaly exists in the network. The anomaly detection platform may perform one or more actions based on determining whether the anomaly exists in the network.

In this way, the anomaly detection platform prevents identification of false anomalous behaviors or false threats, enables identification of true anomalous behaviors or threats, and/or the like. Thus, the anomaly detection platform conserves computing resources (e.g., processing resources, memory resources, communication resources, and/or the like), networking resources, and/or the like that would otherwise be wasted investigating false anomalous behaviors or false threats, identifying the false anomalous behaviors or threats, handling a network outage due to undiscovered behaviors or threats, analyzing poor or incomplete data, and/or the like.

Figure 1A:
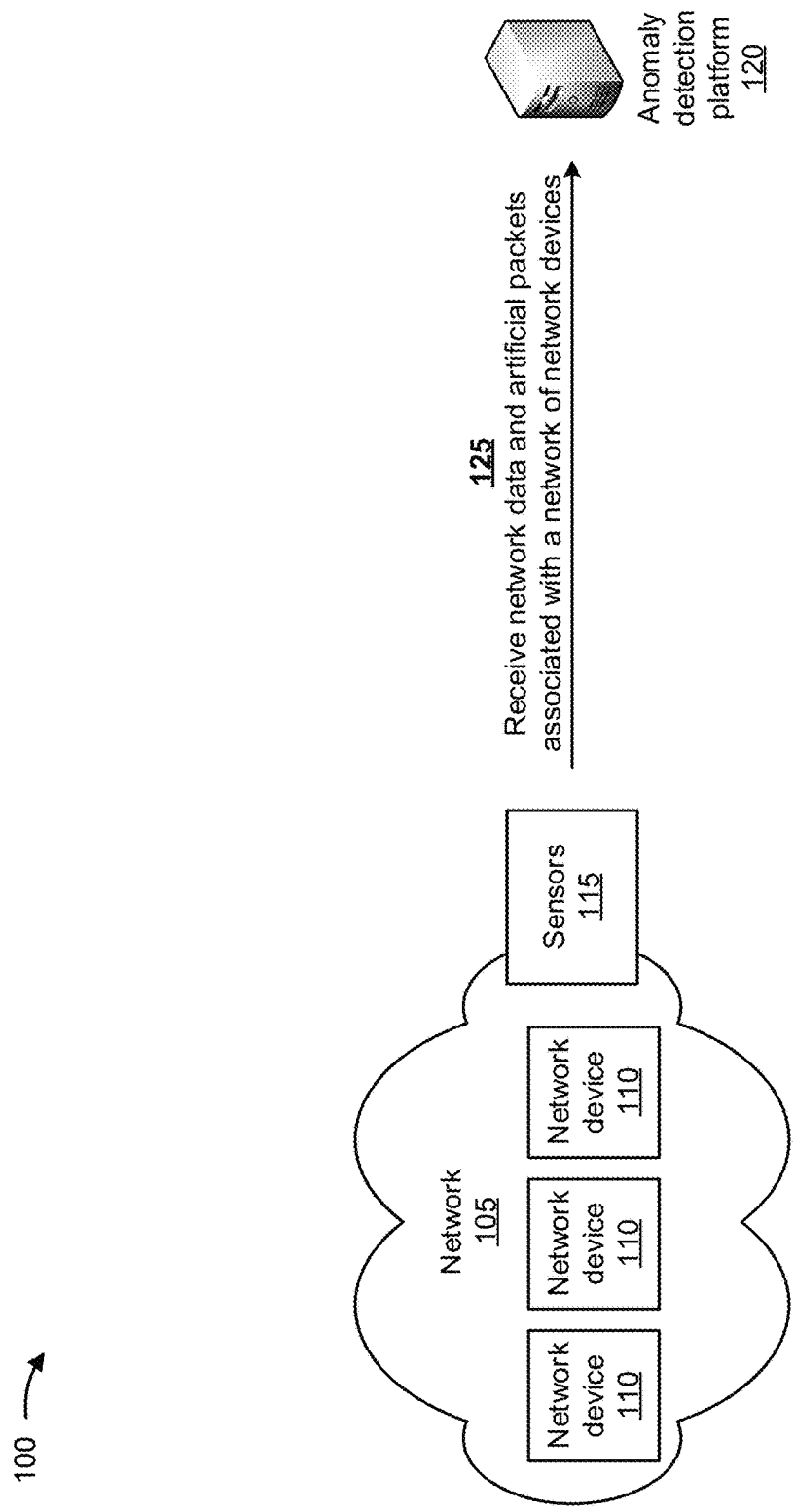

FIGS. 1A-1J are diagrams of one or more example implementations 100 described herein. As shown in FIG. 1A, a network 105 may include multiple network devices 110 and multiple sensors 115 associated with network 105 and/or network devices 110. Sensor 115 may include a hardware-based sensor, a software-based sensor, and/or the like, configured to monitor or collect data associated with network 105 and/or network devices 110. In some implementations, sensors 115 may be provided at different points in network 105, a single sensor 115 may be associated with each network device 110, sensors 115 may be incorporated within network devices 110, sensors 115 may be provided separately from network devices 110, and/or the like.

As further shown in FIG. 1A, and by reference number 125, anomaly detection platform 120 may receive network data associated with network 105 and/or network devices 110). The network data may include data identifying device identifiers associated with network devices 110; internal to external source bandwidth of network 105; external to internal destination bandwidth of network 105; a total bandwidth of network 105 associated with a hypertext transfer protocol (HTTP), a domain name system (DNS), a server message block (SMB), a file transfer protocol (FTP), a remote desktop protocol (RDP), a secure sockets layer (SSL), a secure shell (SSH) protocol, and/or the like; a total quantity of HTTP sessions, DNS sessions, SMB sessions, FTP sessions, RDP sessions, SSL sessions, SSH protocol sessions, and/or the like associated with network 105; and/or the like.

Anomaly detection platform 120 may receive the network data from network devices 110. In some implementations, the network data includes artificial packets from sensors 115 associated with network devices 110, and/or the like. In such implementations, sensors 115 may inject identifiable artificial packets, at predetermined intervals, into the network data. The artificial packets may be utilized by anomaly detection platform 120 to perform data quality measurements of the network data, as described below. Sensors 115 may inject the artificial packets when the network data is collected and at the predetermined intervals. Anomaly detection platform 120 may easily recognize the artificial packets in the network data based on the predetermined intervals (e.g., the artificial packets may be associated with the predetermined intervals, whereas the network data is not associated with the predetermined intervals).

In some implementations, the artificial packets may include characteristics that enable anomaly detection platform 120 to recognize packets as artificial packets rather than actual network packets. Such characteristics may include sources addresses (e.g., source Internet protocol (IP) addresses), destination addresses (e.g., destination IP addresses), source ports, destination ports, virtual local area network (VLAN) tags, and/or the like. In some implementations, an artificial packet may simulate an actual network packet, such as a long-lived flow packet (e.g., an artificial netflow packet a beginning signature and an end signature), a transmission control protocol (TCP) packet (e.g., an artificial packet associated with TCP session), a user datagram protocol (UDP) packet (e.g., an artificial packet associated with a UDP session), an HTTP packet (e.g., an artificial packet associated with an HTTP transfer), a machine-generated certification packet (e.g., an artificial packet associated with a machine-generated certification), a domain generation algorithm (DGA) packet (e.g., an artificial packet associated with a domain name server (DNS) query for a machine-generated looking domain), and/or the like.

In some implementations, anomaly detection platform 120 may periodically receive the network data, may continuously receive the network data, and/or the like. In some implementations, anomaly detection platform 120 may store the network data in a data structure (e.g., a database, a table, a list, and/or the like) included in or otherwise associated with anomaly detection platform 120.

Figure 1B:
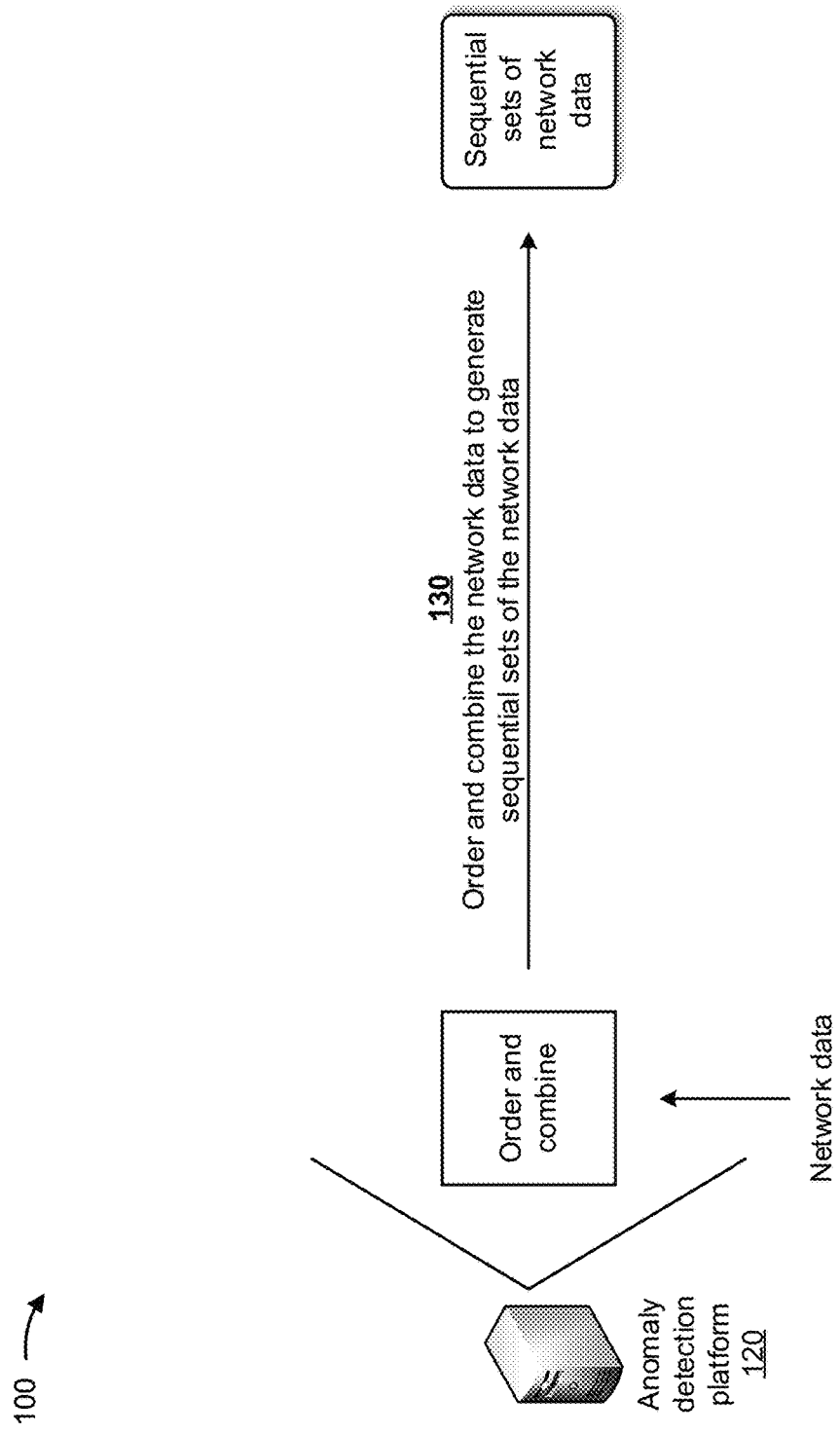

As shown in FIG. 1B, and by reference number 130, anomaly detection platform 120 may order and combine the network data to generate sequential sets of the network data. In implementations in which artificial packets have been included in the network data, the artificial packets may be included in the ordering and combination of the network data to generate the sequential sets of the network data. In some implementations, anomaly detection platform 120 may process the network data by ordering the network data into sequential network data. For example, anomaly detection platform 120 may utilize time stamps associated with the network data (e.g., packets of the network data) to generate sequential network data. Anomaly detection platform 120 may group the sequential network data into sets (e.g., based on a predetermined time interval or user-defined time interval) to generate the sequential sets of the network data.

As shown in FIG. 1C, and by reference number 135, anomaly detection platform 120 may process the sequential sets of network data, with a time series model, to generate time series network data. The time series network data may include a sequence of data points of the network data that is based on successive measurements (e.g., by sensors 115) over a particular time interval (e.g., every minute, every five minutes, every hour, after passage of a predetermined amount of time or an amount of time set by an operator or a user, and/or the like). The time series model may be trained with historical network data prior to receiving the network data. In some implementations, the time series model may be trained by anomaly detection platform 120, may be trained by another device and received by anomaly detection platform 120, and/or the like. In implementations in which artificial packets have been included in the network data, the artificial packets may be included in the processing to generate times series network data.

In some implementations, the time series model may include a Holt-Winter time series model, a Nelder-Mead parameter optimization model, and/or the like. For example, anomaly detection platform 120 may apply a Holt-Winter exponential smoothing technique to smooth the sequential sets of network data, and may apply a Nelder-Mead model (e.g., a downhill simplex model, amoeba model, polytope model, and/or the like) to determine a minimum or a maximum of an objective function in order to optimize the sequential sets of network data and generate the time series network data.

In some implementations, anomaly detection platform 120 or another device may train the time series model with historical network data associated with a network (e.g., network 105) and/or network devices (e.g., network devices 110). For example, anomaly detection platform 120 may separate the historical network data into a training set, a validation set, a test set, and/or the like. The training set may be utilized to train the time series model. The validation set may be utilized to validate results of the trained time series model. The test set may be utilized to test operation of the time series model.

In some implementations, anomaly detection platform 120 may train the time series model using, for example, an unsupervised training procedure, and based on the historical network data. For example, anomaly detection platform 120 may perform dimensionality reduction to reduce the historical network data to a minimum feature set, thereby reducing resources (e.g., processing resources, memory resources, and/or the like) to train the time series model, and may apply a classification technique to the minimum feature set.

In some implementations, anomaly detection platform 120 may use a logistic regression classification technique to determine a categorical outcome (e.g., that particular historical network data indicates that measured network quality is associated with a particular data point in a time series). Additionally, or alternatively, anomaly detection platform 120 may use a naïve Bayesian classifier technique. In this case, anomaly detection platform 120 may perform binary recursive partitioning to split the historical network data into partitions and/or branches and use the partitions and/or branches to determine outcomes. Based on using recursive partitioning, anomaly detection platform 120 may reduce utilization of computing resources relative to manual, linear sorting and analysis of data points, thereby enabling use of thousands, millions, or billions of data points to train the time series model, which may result in a more accurate model than using fewer data points.

Additionally, or alternatively, anomaly detection platform 120 may use a support vector machine (SVM) classifier technique to generate a non-linear boundary between data points in the training set. In this case, the non-linear boundary is used to classify test data into a particular class.

Additionally, or alternatively, anomaly detection platform 120 may train the time series model using a supervised training procedure that includes receiving input to the time series model from a subject matter expert, which may reduce an amount of time, an amount of processing resources, and/or the like to train the time series model relative to an unsupervised training procedure. In some implementations, anomaly detection platform 120 may use one or more other model training techniques, such as a neural network technique, a latent semantic indexing technique, and/or the like. For example, anomaly detection platform 120 may perform an artificial neural network processing technique (e.g., using a two-layer feedforward neural network architecture, a three-layer feedforward neural network architecture, and/or the like) to perform pattern recognition with regard to patterns of the historical network data. In this case, using the artificial neural network processing technique may improve an accuracy of the trained time series model generated by anomaly detection platform 120, by being more robust to noisy, imprecise, or incomplete data, and by enabling anomaly detection platform 120 to detect patterns and/or trends undetectable to human analysts or systems using less complex techniques.

Figure 1D:
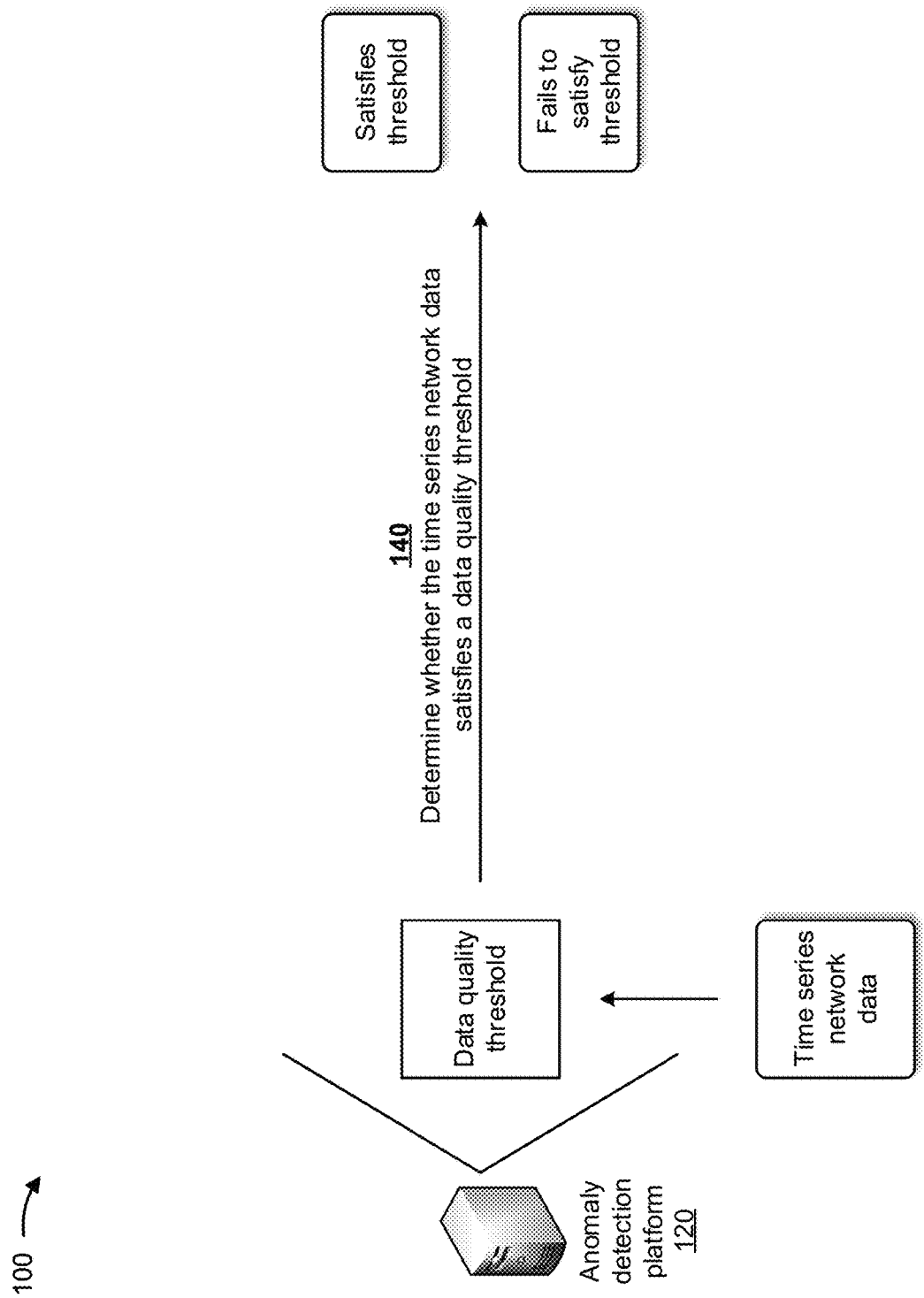

As shown in FIG. 1D, and by reference number 140, anomaly detection platform 120 may determine whether the time series network data satisfies a data quality threshold. In some implementations, the data quality threshold may include a threshold identifying a predetermined quantity of packets in the time series network data, a threshold identifying a predetermined quantity of data points in the time series network data, a threshold based on a quantity of measurements received by sensors 115, a threshold based on a quantity of time over which the network data is collected, and/or the like. As further shown in FIG. 1D, anomaly detection platform 120 may determine that the time series network data satisfies the data quality threshold or fails to satisfy the data quality threshold.

In some implementations, anomaly detection platform 120 may utilize the artificial packets (e.g., characteristics of the artificial packets) included in the network data to perform data quality measurements of the network data. For example, if artificial packets that are expected to be in the network data are missing, anomaly detection platform 120 may determine that network 105 has a capture policy issue or a data transfer issue. If artificial packets are present in the network data (e.g., with correct sizes and bytes) but quality of service-related artificial packets are missing, anomaly detection platform 120 may determine that network 105 has a quality of service issue. If intrusion detection system-related artificial packets are missing, anomaly detection platform 120 may determine an issue with an intrusion detection system. If a quantity of received artificial packets fails to satisfy a detection threshold (e.g., less than 95%, 90%, 85%, etc.), anomaly detection platform 120 may determine that detection issues need to be addressed (e.g., by identifying a delay in network 105, an inoperable network device, and/or the like). If some of the artificial packets are missing, anomaly detection platform 120 may determine that network 105 is experiencing data loss, needs optimization, requires filtering policies, is experiencing a security event, and/or the like. If a low percentage of the artificial packets are received, anomaly detection platform 120 may suggest a change in a data collection approach (e.g., to increase a quantity of data collected to ensure that a particular percentage of artificial packets are received). If no artificial packets are received, anomaly detection platform 120 may determine a problem with sensor 115 (e.g., the missing artificial packets may be associated with sensor 115 and failure to receive such artificial packets may indicate data loss at sensor 115 or a network device associate with sensor 115). If byte sizes of all of the artificial packets are less than expected, anomaly detection platform 120 may determine protocol issues associated with network 105 (e.g., since the protocol may be removing information from the artificial packets). If byte sizes of some of the artificial packets are less than expected, anomaly detection platform 120 may determine a data loss issue associated with network 105. If quality of service-related artificial packets and intrusion detection system-related artificial packets are missing, anomaly detection platform 120 may determine an intake issue associated with network 105. If receipt of the artificial packets is delayed (e.g., sensor 115 may record a start time for an artificial packet and determine a difference between a packet observation time and the start to determine whether the artificial packet is delayed), anomaly detection platform 120 may determine lag issues associated with network 105.

In some implementations, anomaly detection platform 120 may utilize such information to perform one or more actions as described below. For example, anomaly detection platform 120 may provide, to a device associated with a network administrator, an alert indicating an anomaly, may automatically take preemptive action to eliminate or contain the anomaly, and/or the like.

In this way, anomaly detection platform 120 may utilize the artificial packets to perform data quality measurements of the network data. Thus, the artificial packets may provide confidence that the network data is of good quality, and may enable anomaly detection platform 120 to perform preventative actions for any issues.

Figure 1E:
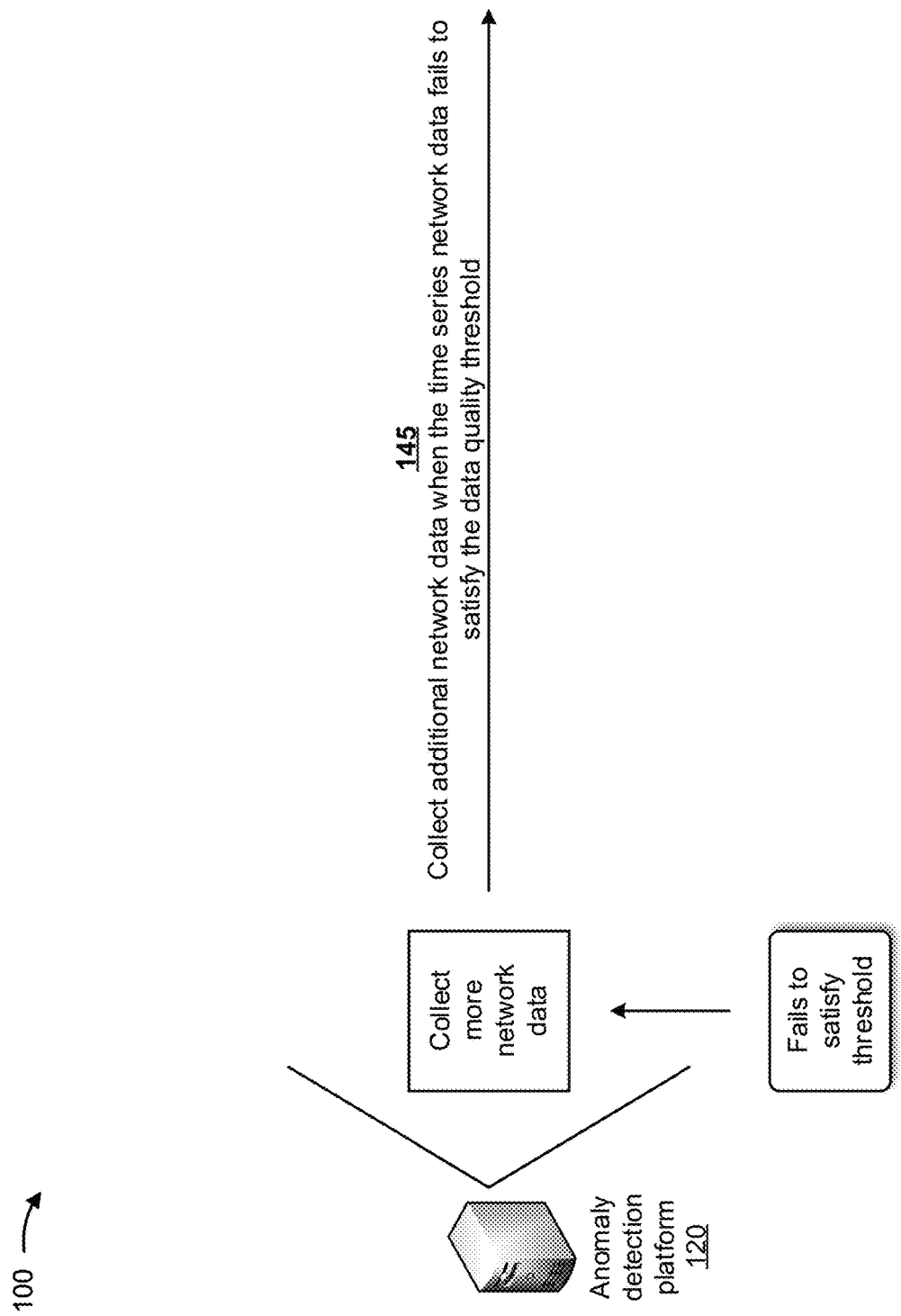

As shown in FIG. 1E, and by reference number 145, in some implementations, anomaly detection platform 120 may collect additional network data (e.g., without artificial packets) when the time series network data fails to satisfy the data quality threshold. In some implementations, anomaly detection platform 120 may perform functions similar to those described above with respect to FIGS. 1A-1D (e.g., to receive the additional network data, order and combine the additional network data, process sequential sets of the additional network data, and determine whether time series network data satisfies the data quality threshold) one or more times until anomaly detection platform 120 determines that the time series network data satisfies the data quality threshold.

Figure 1F:
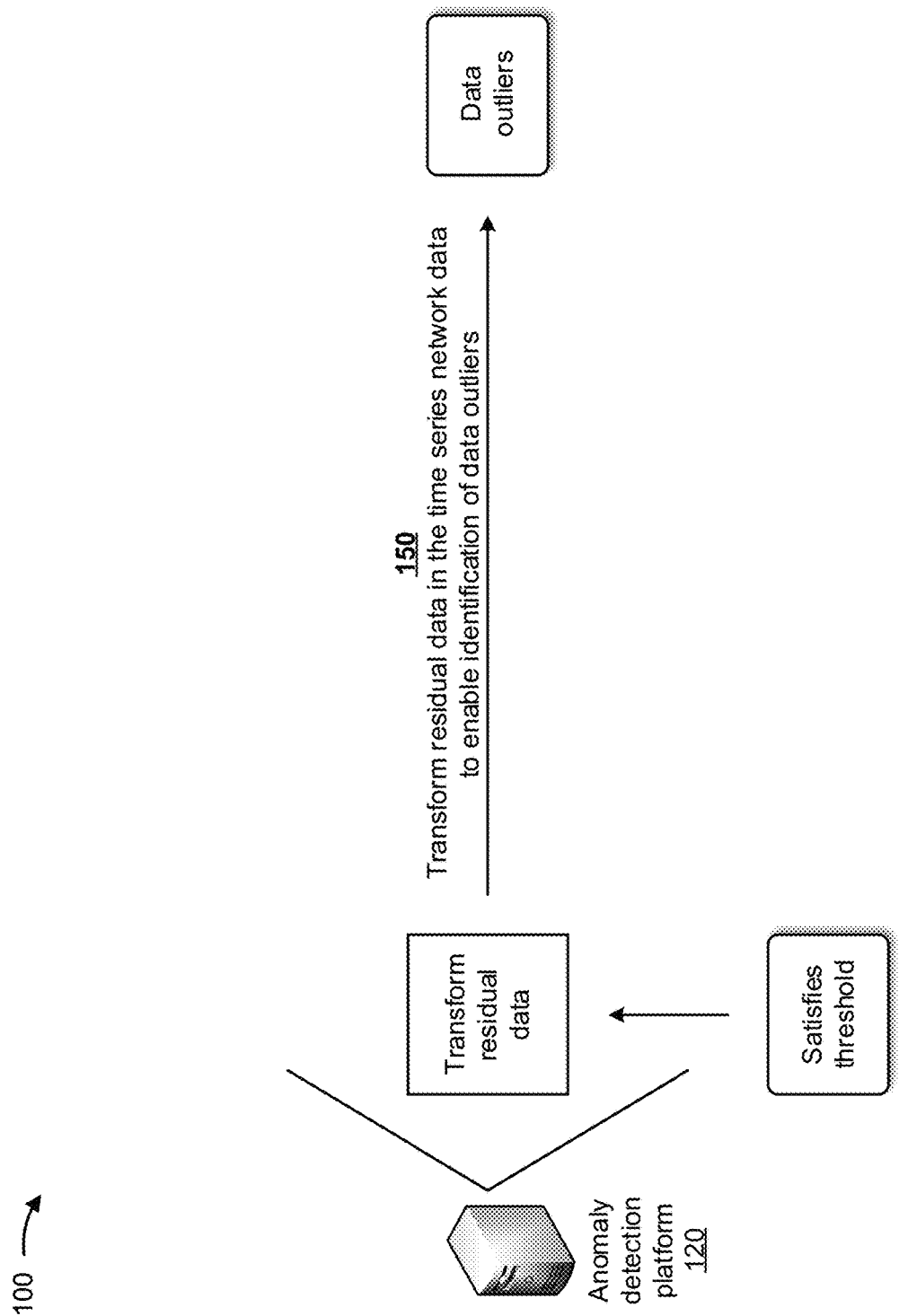

As shown in FIG. 1F, and by reference number 150, when the time series network data satisfies the data quality threshold, anomaly detection platform 120 may transform residual data in the time series network data to enable identification of data outliers. For example, anomaly detection platform 120 may process the time series network data, with a Box-Cox residual transformation model, a maximum likelihood estimation model, and/or the like, to transform the residual data in the time series network data. Anomaly detection platform 120 may process the transformed residual data, with a Brent's method of optimization model (e.g., a maximum likelihood estimation optimization model) and/or the like, to identify the data outliers in the time series network data. In some implementations, the Box-Cox residual transformation model, the maximum likelihood estimation model, the Brent's method of optimization model, and/or the like may be trained (e.g., or received from another device) by anomaly detection platform 120 in a manner described above in connection with FIG. 1C.

Figure 1G:
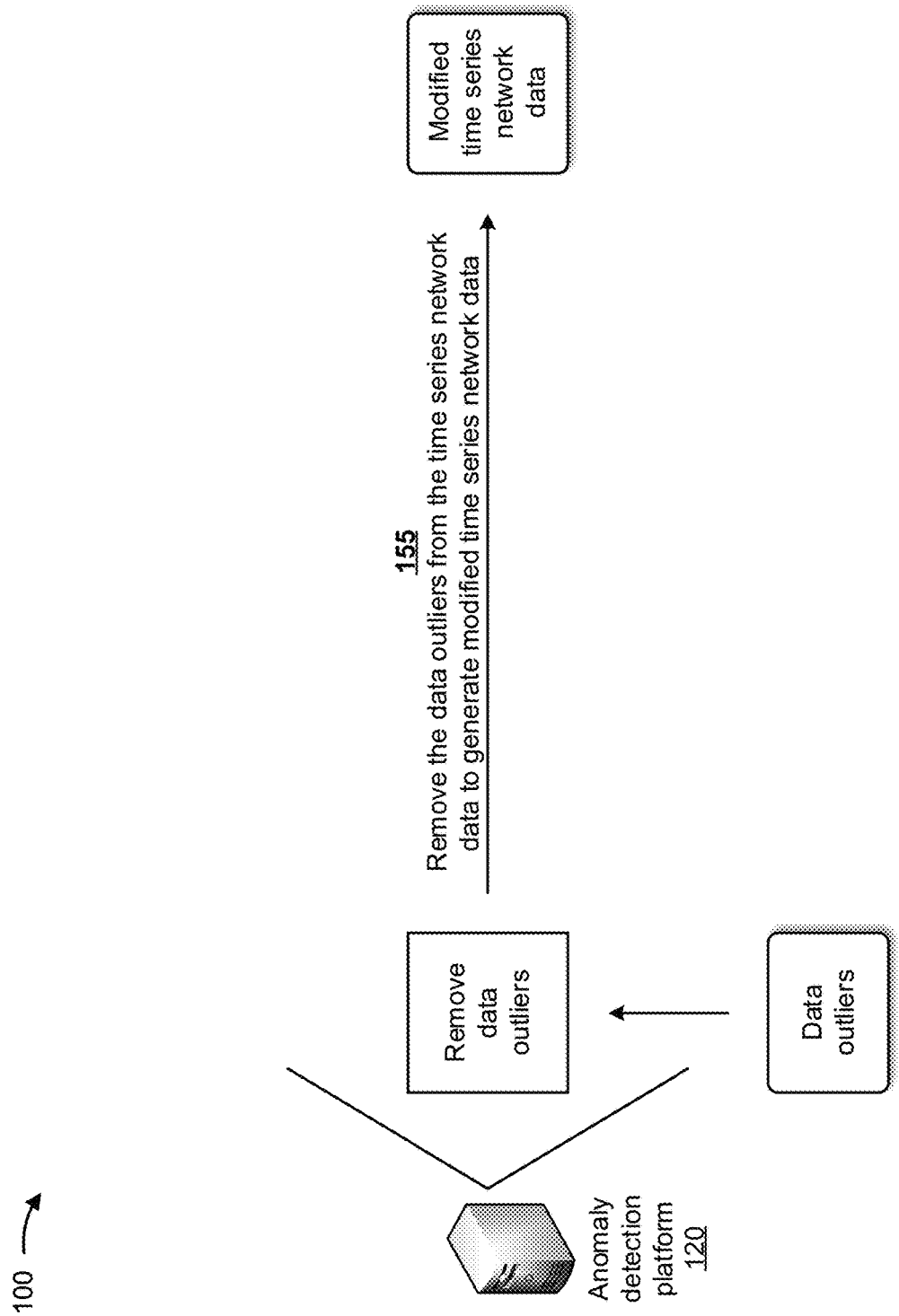

As shown in FIG. 1G, and by reference number 155, anomaly detection platform 120 may remove the data outliers from the time series network data to generate modified time series network data. In some implementations, the modified time series network data may include the time series network data without the data outliers. Anomaly detection platform 120 may store the modified time series network data in a data structure (e.g., a database, a table, a list, and/or the like) associated with anomaly detection platform 120.

Figure 1H:
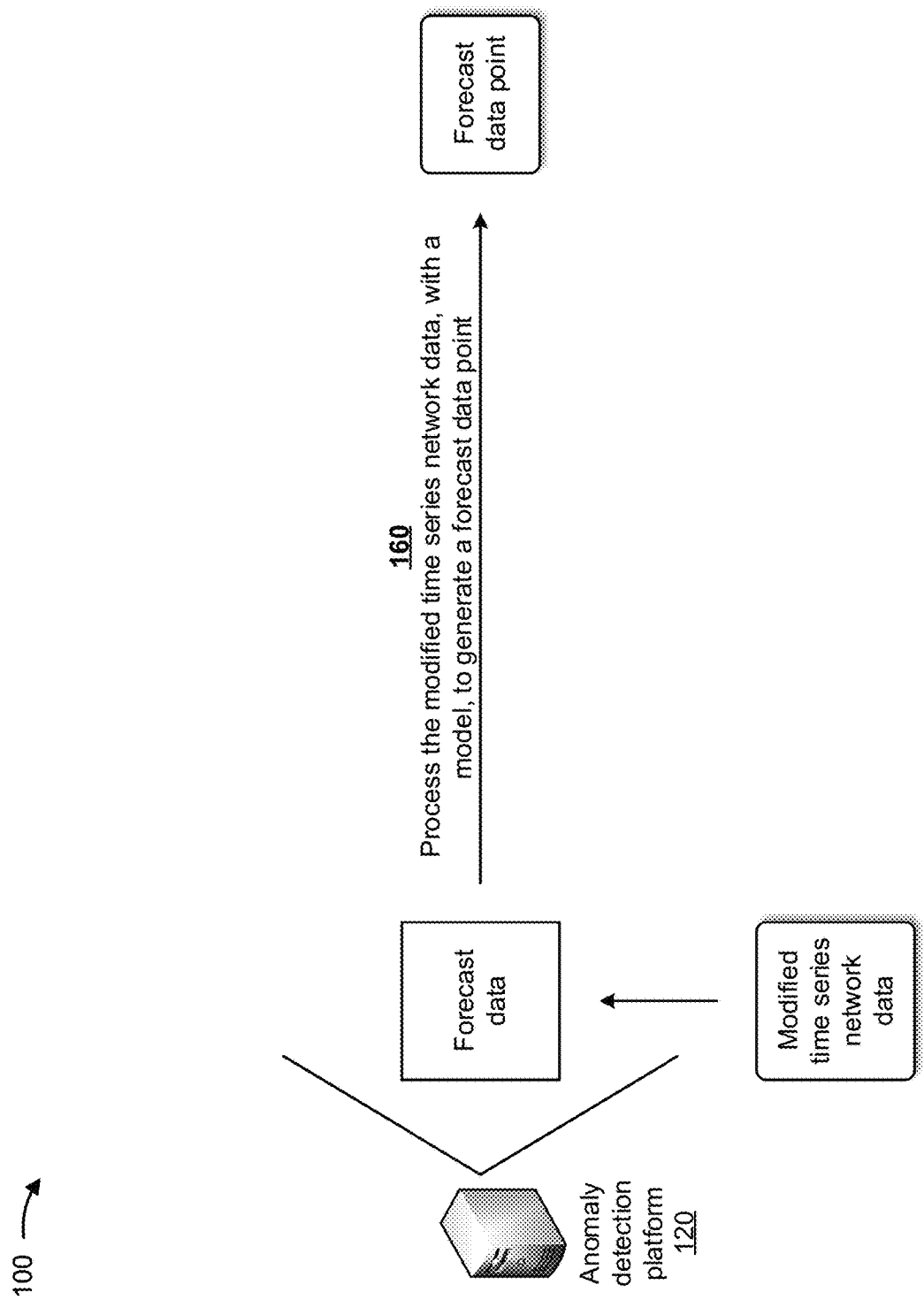

As shown in FIG. 1H, and by reference number 160, anomaly detection platform 120 may process the modified time series network data, with a model, to generate a forecast data point. In some implementations, the model may include a Holt-Winter time series model, a univariate anomaly model, a multivariate anomaly model, and/or the like. Anomaly detection platform 120 may process the modified time series network data with a model that is trained, validated, and/or tested in a manner described above in connection with FIG. 1C. For example, the model may be trained, prior to receiving the network data, based on historical modified time series network data. The model may be trained by anomaly detection platform 120, by another device and thereafter received by anomaly detection platform 120, and/or the like. Anomaly detection platform 120 may utilize the model to generate one or more forecast data points.

Figure 1I:
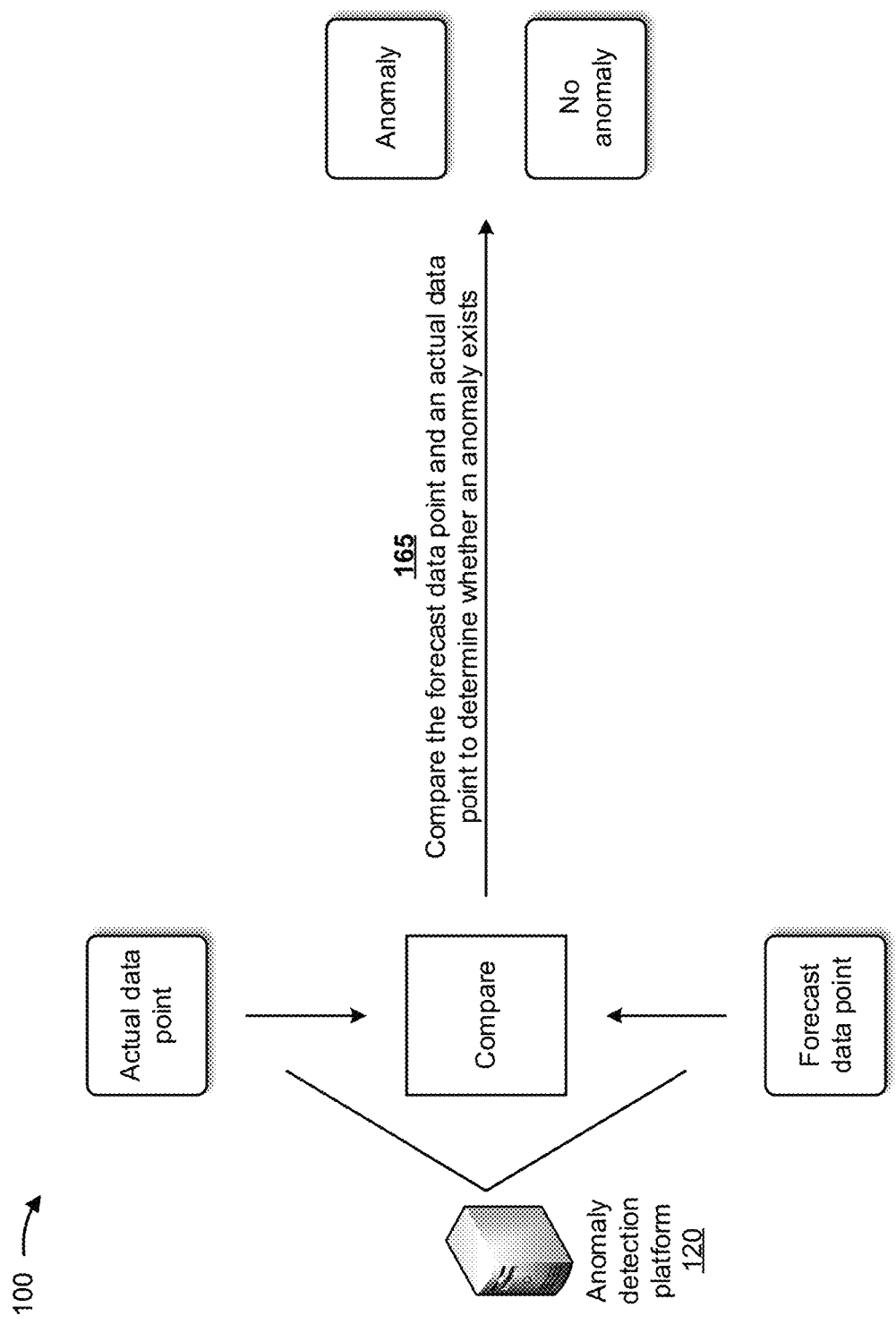

As shown in FIG. 1I, and by reference number 165, anomaly detection platform 120 may compare the forecast data point and an actual data point to determine whether an anomaly exists. The forecast data point may include a data point predicting a value at a particular point in time, and the actual data point may include a data point indicating an actual value at the particular point in time. The forecast data point, the actual data point, and the anomaly may be associated with an internal to external source bandwidth of network 105; an external to internal destination bandwidth of network 105; a total bandwidth of network 105 associated with an HTTP, a DNS, an SMB, an FTP, an RDP, an SSL, an SSH protocol, and/or the like; and/or the like. In some implementations, if anomaly detection platform 120 generates multiple forecast data points, anomaly detection platform 120 may compare the multiple forecast data points and multiple actual data points to determine whether one or more anomalies exist.

Figure 1J:
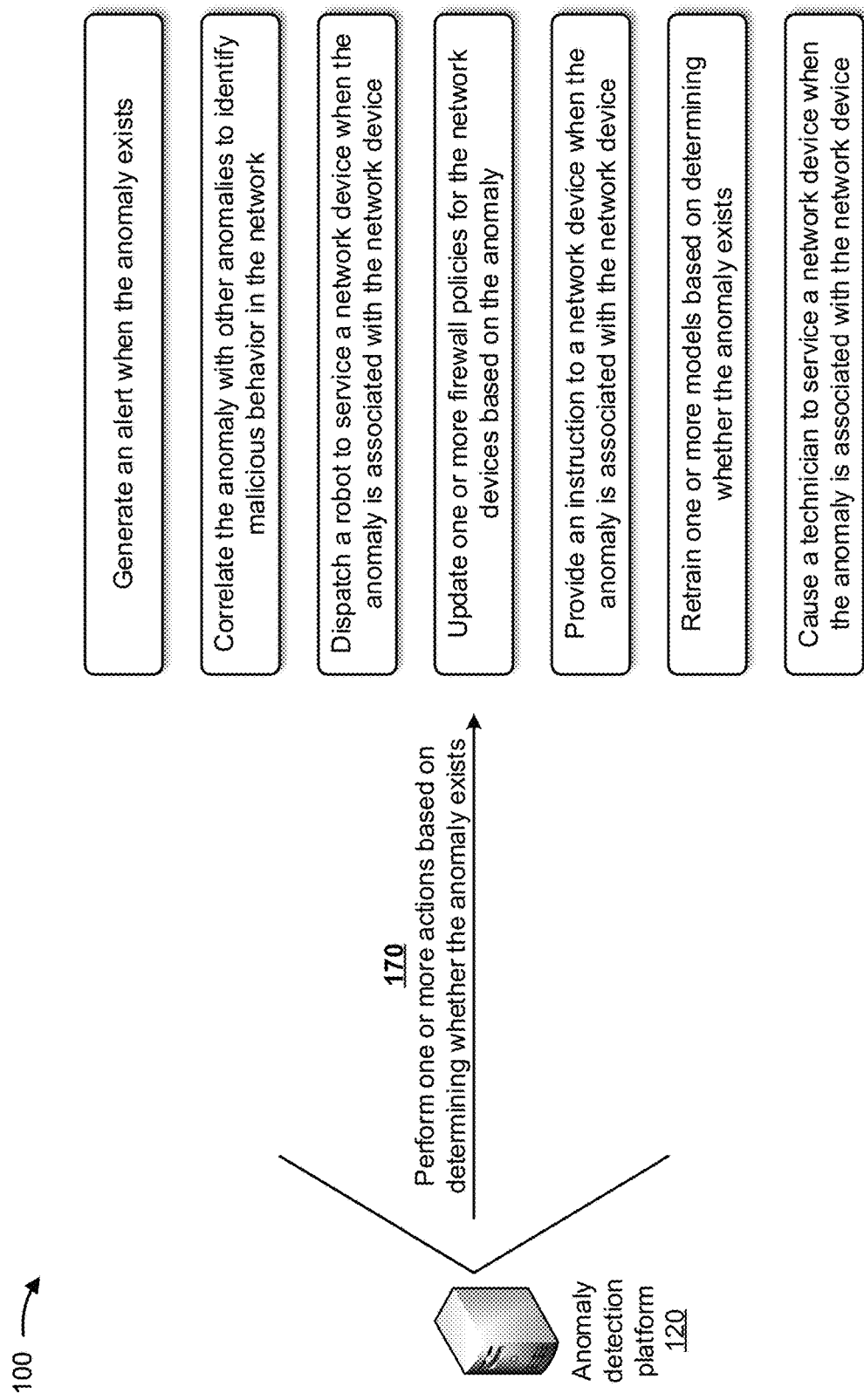

As shown in FIG. 1J, and by reference number 170, anomaly detection platform 120 may perform one or more actions based on determining whether the anomaly exists. The one or more actions may include anomaly detection platform 120 generating an alert when the anomaly exists. The alert may be provided, for example, to one or more operators or processes associated with network 105, network devices 110, and/or the like. In this way, an anomaly may be identified, such that a threat level associated with the anomaly may be assessed, mitigative actions to perform in response to the threat level may be determined, and/or the like. This conserves computing resources, networking resources, and/or the like that would otherwise be required to identify the anomaly, handle a network outage due to undiscovered behaviors or threats, and/or the like.

The one or more actions may include anomaly detection platform 120 correlating the anomaly with other anomalies to identify malicious behavior in network 105. In this way, a likelihood of correctly identifying an anomaly that is actually associated with malicious behavior in network 105 may be increased, and anomaly detection platform 120 may conserve computing resources, networking resources, and/or the like that would otherwise be wasted investigating false anomalous behaviors or false threats, identifying the false anomalous behaviors or threats, and/or the like.

The one or more actions may include anomaly detection platform 120 dispatching a robot (e.g., an autonomous machine, a semi-autonomous machine, or a remotely-controlled machine) to service network device 110 when the anomaly is associated with network device 110. In this way, anomaly detection platform 120 may automatically perform mitigative actions with respect to network device 110, which may remove human subjectivity and waste from such actions.

The one or more actions may include anomaly detection platform 120 updating one or more firewall policies for network devices 110 based on the anomaly (e.g., to block network traffic associated with the anomaly). In this way, anomaly detection platform 120 may prevent future threats to network 105, and may conserve computing resources, networking resources, and/or the like that would otherwise be wasted investigating or identifying anomalous behaviors or threats, handling a network outage due to undiscovered behaviors or threats, and/or the like.

The one or more actions may include anomaly detection platform 120 providing an instruction to network device 110 when the anomaly is associated with network device 110. For example, anomaly detection platform 120 may instruct network device 110 to power off, power on, disconnect from network 105, enable/increase logging activity to allow for further investigation, and/or the like. In this way, anomaly detection platform 120 may prevent network device 110 from threatening the integrity of network 105, without affecting other network devices 110 of network 105. This may conserve computing resources, networking resources, and/or the like that would otherwise be wasted investigating false anomalous behaviors or false threats, identifying the false anomalous behaviors or threats, and/or the like.

The one or more actions may include anomaly detection platform 120 retraining one or more models based on determining whether the anomaly exists. In this way, anomaly detection platform 120 may improve the accuracy of one or more models in identifying anomalies, analyzing a threat level associated with the anomalies, and/or determining actions to perform in response to the threat level. This may conserve computing resources, networking resources, and/or the like that would otherwise be wasted investigating false anomalous behaviors or false threats, identifying the false anomalous behaviors or threats, handling a network outage due to undiscovered behaviors or threats, analyzing poor or incomplete data, and/or the like.

The one or more actions may include anomaly detection platform 120 communicating an alert to a network operations center or other network management entity associated with network 105, such that the network management entity may initiate an investigation process for network device 110 when the anomaly is associated with network device 110 (e.g., displaying an alert notification on a user interface, creating a trouble ticket, assigning a technician, scheduling a service date/time, alerting location personnel). In this way, anomaly detection platform 120 may automatically cause network device 110, with which a threat is associated, to be investigated by a technician. This may improve threat assessment accuracy and speed of service, which may in turn conserve computing resources, networking resources, and/or the like that would otherwise be wasted in inaccurate threat assessment, identifying a technician, and/or the like.

In this way, several different stages of the process for determining network data quality and identifying anomalous network behavior are automated via modeling, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that determines network data quality and identifies anomalous network behavior. Finally, the process for determining network data quality and identifying anomalous network behavior conserves computing resources (e.g., processing resources, memory resources, communication resources, and/or the like), networking resources, and/or the like that would otherwise be wasted investigating false anomalous behaviors or false threats, identifying the false anomalous behaviors or threats, handling a network outage due to undiscovered behaviors or threats, analyzing poor or incomplete data, and/or the like.

As indicated above, FIGS. 1A-1J are provided merely as examples. Other examples may differ from what was described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
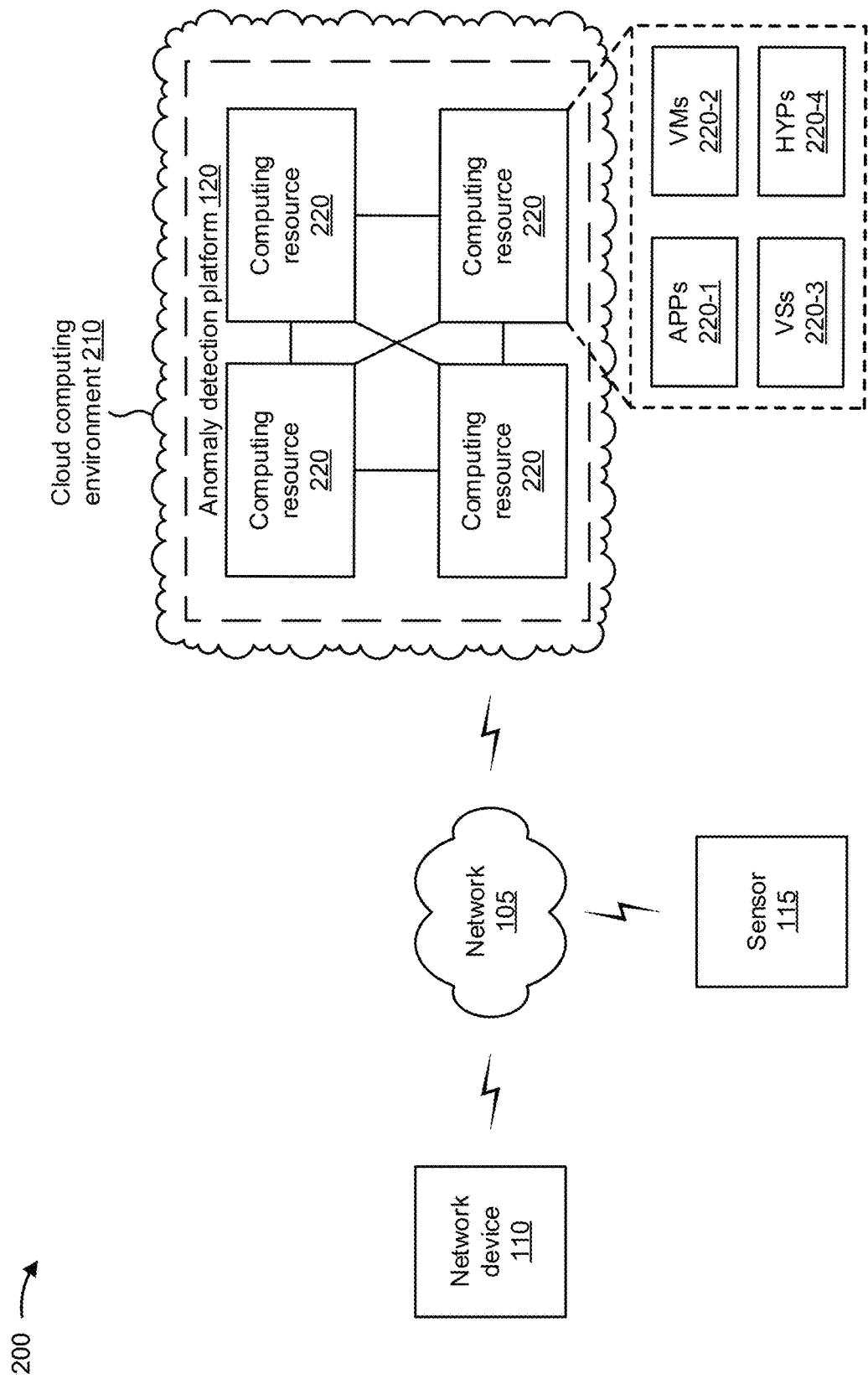
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network 105, network device 110, sensor 115, and anomaly detection platform 120. Devices of environment 200 may interconnect via wired connections, wireless connections, or a combination of wired and wireless connections.

Network 105 includes one or more wired and/or wireless networks. For example, network 105 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 110 includes one or more devices (e.g., one or more traffic transfer devices) capable of receiving, providing, storing, generating, and/or processing information described herein. For example, network device 110 may include a firewall, a router, a policy enforcer, a gateway, a switch, a hub, a bridge, a reverse proxy, a server (e.g., a proxy server), a security device, an intrusion detection device, a load balancer, or a similar device. In some implementations, network device 110 may receive information from and/or provide information to one or more other devices of environment 200. In some implementations, network device 110 may be a physical device implemented within a housing, such as a chassis. In some implementations, network device 110 may be a virtual device implemented by one or more computer devices of a cloud computing environment or a data center.

Sensor 115 may include a hardware-based sensor, a software-based sensor, and/or the like, that is capable of monitoring network device 110 and/or traffic flow (e.g., network data) associated with network device 110, and triggering a network alarm if a particular metric or value monitored by sensor 115 satisfies or fails to satisfy a particular threshold level of performance. For example, sensor 115 may include a hardware-based probe, a software-based probe, and/or the like, provided at a location of network 105 for the purpose of monitoring or collecting data about network activity. In some implementations, sensor 115 may be included within network device 110 or may be separate from network device 110.

Anomaly detection platform 120 includes one or more devices that determine network data quality and identify anomalous network behavior. In some implementations, anomaly detection platform 120 may be designed to be modular such that certain software components may be swapped in or out depending on a particular need. As such, anomaly detection platform 120 may be easily and/or quickly reconfigured for different uses. In some implementations, anomaly detection platform 120 may receive information from and/or transmit information to one or more network devices 110 and/or sensors 115.

In some implementations, as shown, anomaly detection platform 120 may be hosted in a cloud computing environment 210. Notably, while implementations described herein describe anomaly detection platform 120 as being hosted in cloud computing environment 210, in some implementations, anomaly detection platform 120 may not be cloud-based (i.e., may be implemented outside of a cloud computing environment) or may be partially cloud-based.

Cloud computing environment 210 includes an environment that hosts anomaly detection platform 120. Cloud computing environment 210 may provide computation, software, data access, storage, etc., services that do not require end-user knowledge of a physical location and configuration of system(s) and/or device(s) that hosts anomaly detection platform 120. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host anomaly detection platform 120. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client devices associated with cloud computing environment 210. Application 220-1 may eliminate a need to install and execute the software applications on client devices. For example, application 220-1 may include software associated with anomaly detection platform 120 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of a client device or an operator of anomaly detection platform 120), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
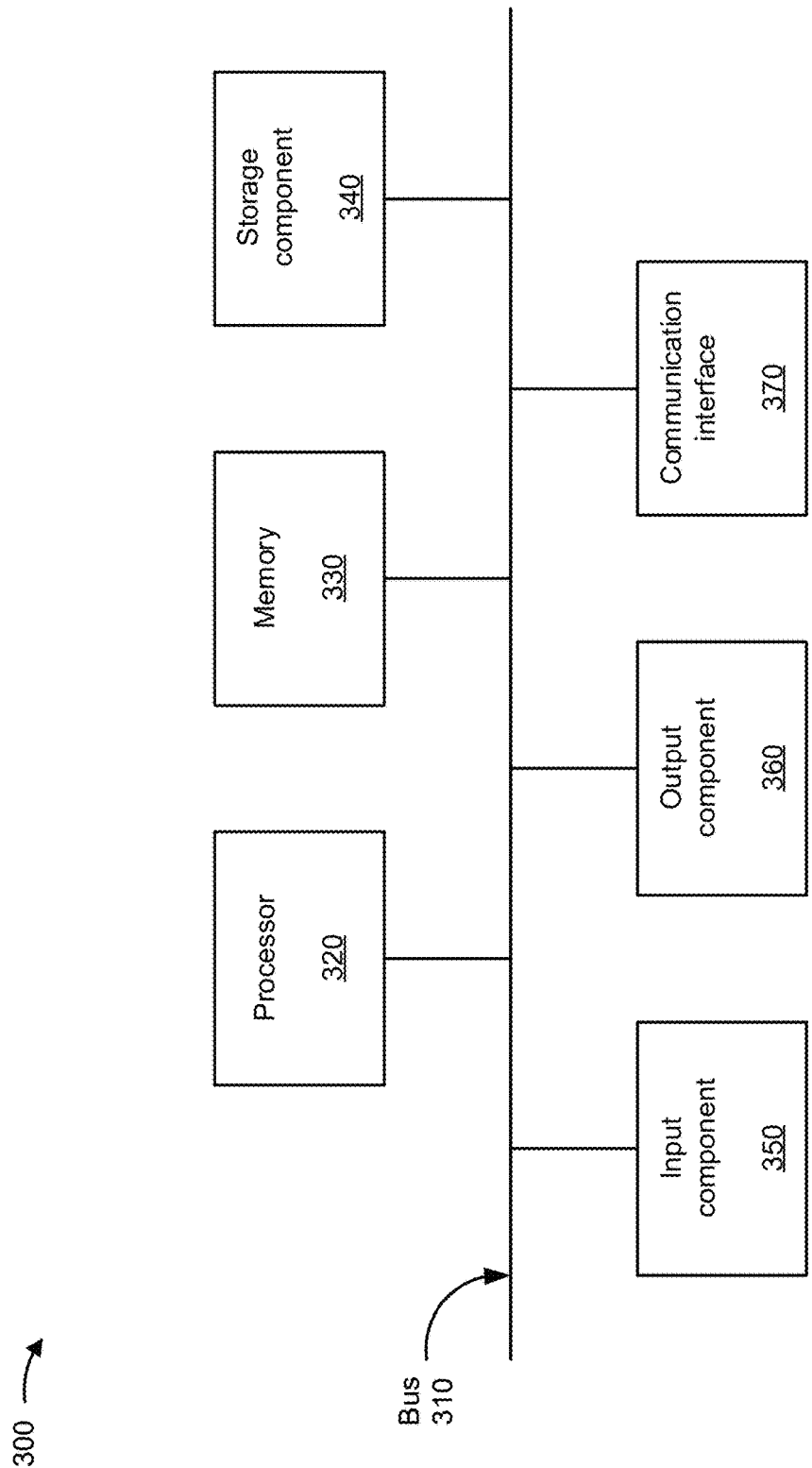
FIG. 3 is a diagram of example components of one or more devices of FIG. 2.

FIG. 3 is a diagram of example components of a device 300. Device 300 may correspond to network device 110, sensor 115, anomaly detection platform 120, and/or computing resource 220. In some implementations, network device 110, sensor 115, anomaly detection platform 120, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
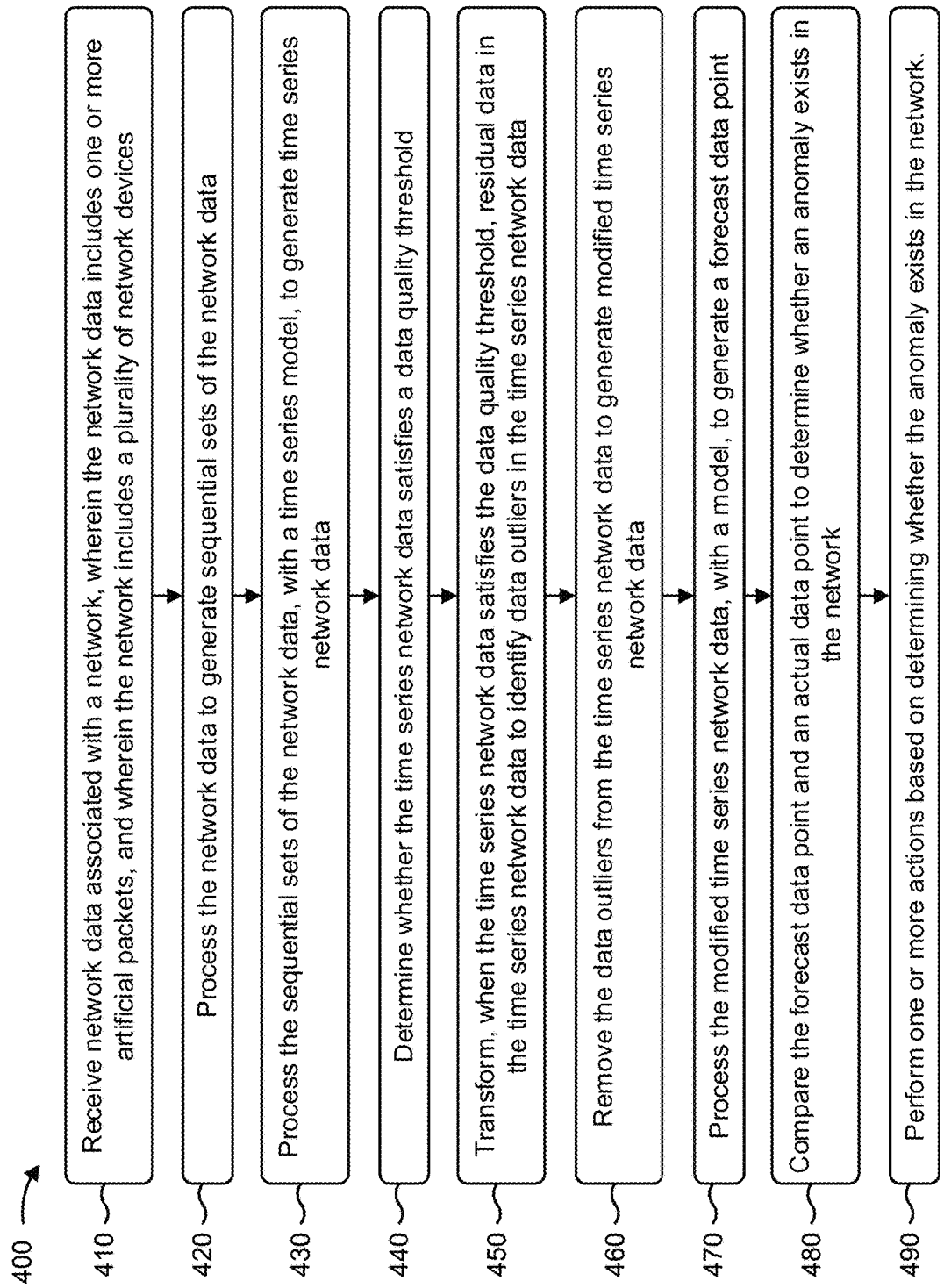
FIG. 4 is a flow chart of an example process for determining network data quality and identifying anomalous network behavior.

FIG. 4 is a flow chart of an example process 400 for determining network data quality and identifying anomalous network behavior. In some implementations, one or more process blocks of FIG. 4 may be performed by an anomaly detection platform (e.g., anomaly detection platform 120). In some implementations, one or more process blocks of FIG. 4 may be performed by another device or a group of devices separate from or including the anomaly detection platform.

As shown in FIG. 4, process 400 may include receiving network data associated with a network, wherein the network data includes one or more artificial packets, and wherein the network includes a plurality of network devices (block 410). For example, the anomaly detection platform (e.g., using computing resource 220, processor 320, communication interface 370, and/or the like) may receive network data associated with a network, as described above. In some implementations, the network data may include one or more artificial packets, and the network may include a plurality of network devices.

As further shown in FIG. 4, process 400 may include processing the network data to generate sequential sets of the network data (block 420). For example, the anomaly detection platform (e.g., using computing resource 220, processor 320, memory 330, and/or the like) may process the network data to generate sequential sets of the network data, as described above.

As further shown in FIG. 4, process 400 may include processing the sequential sets of the network data, with a time series model, to generate time series network data (block 430). For example, the anomaly detection platform (e.g., using computing resource 220, processor 320, storage component 340, and/or the like) may process the sequential sets of the network data, with a time series model, to generate time series network data, as described above.

As further shown in FIG. 4, process 400 may include determining whether the time series network data satisfies a data quality threshold (block 440). For example, the anomaly detection platform (e.g., using computing resource 220, processor 320, memory 330, and/or the like) may determine whether the time series network data satisfies a data quality threshold, as described above.

As further shown in FIG. 4, process 400 may include transforming, when the time series network data satisfies the data quality threshold, residual data in the time series network data to identify data outliers in the time series network data (block 450). For example, the anomaly detection platform (e.g., using computing resource 220, processor 320, storage component 340, and/or the like) may transform, when the time series network data satisfies the data quality threshold, residual data in the time series network data to identify data outliers in the time series network data, as described above.

As further shown in FIG. 4, process 400 may include removing the data outliers from the time series network data to generate modified time series network data (block 460). For example, the anomaly detection platform (e.g., using computing resource 220, processor 320, memory 330, and/or the like) may remove the data outliers from the time series network data to generate modified time series network data, as described above.

As further shown in FIG. 4, process 400 may include processing the modified time series network data, with a model, to generate a forecast data point (block 470). For example, the anomaly detection platform (e.g., using computing resource 220, processor 320, storage component 340, and/or the like) may process the modified time series network data, with a model, to generate a forecast data point, as described above.

As further shown in FIG. 4, process 400 may include comparing the forecast data point and an actual data point to determine whether an anomaly exists in the network (block 480). For example, the anomaly detection platform (e.g., using computing resource 220, processor 320, memory 330, and/or the like) may compare the forecast data point and an actual data point to determine whether an anomaly exists in the network, as described above.

As further shown in FIG. 4, process 400 may include performing one or more actions based on determining whether the anomaly exists in the network (block 490). For example, the anomaly detection platform (e.g., using computing resource 220, processor 320, memory 330, storage component 340, communication interface 370, and/or the like) may perform one or more actions based on determining whether the anomaly exists in the network, as described above.

Process 400 may include additional implementations, such as any single implementation or any combination of implementations described below and/or in connection with one or more other processes described elsewhere herein.

In a first implementation, when processing the network data to generate the sequential sets of the network data, the anomaly detection platform may order the network data to generate sequential network data, and may group the sequential network data into sets to generate the sequential sets of the network data.

In a second implementation, alone or in combination with the first implementation, the anomaly detection platform may receive additional network data when the time series network data fails to satisfy the data quality threshold.

In a third implementation, alone or in combination with one or more of the first and second implementations, when performing the one or more actions, the anomaly detection platform may generate an alert when the anomaly exists in the network, may correlate the anomaly with other anomalies to identify malicious behavior in the network, may update one or more firewall policies for the plurality of network devices based on the anomaly, may retrain at least one of the time series model or the model based on determining whether the anomaly exists in the network, and/or the like.

In a fourth implementation, alone or in combination with one or more of the first through third implementations, when performing the one or more actions, the anomaly detection platform may dispatch a robot to service one of the plurality of network devices when the anomaly is associated with the one of the plurality of network devices, may provide an instruction to one of the plurality of network devices when the anomaly is associated with the one of the plurality of network devices, may communicate an alert to a network management entity to initiate an investigation process for one of the plurality of network devices when the anomaly is associated with the one of the plurality of network devices, and/or the like.

In a fifth implementation, alone or in combination with one or more of the first through fourth implementations, when receiving the network data associated with the network, the anomaly detection platform may receive the network data from one or more sensors associated with the plurality of network devices.

In a sixth implementation, alone or in combination with one or more of the first through fifth implementations, when processing the sequential sets of the network data, with the time series model, to generate the time series network data, the anomaly detection platform may process the sequential sets of the network data with a Holt-Winter time series model and a Nelder-Mead parameter optimization model, to generate the time series network data.

In a seventh implementation, alone or in combination with one or more of the first through sixth implementations, when transforming the residual data in the time series network data to identify the data outliers in the time series network data, the anomaly detection platform may process the time series network data, with one of a Box-Cox residual transformation model or a maximum likelihood estimation model, to transform the residual data in the time series network data, and may process the transformed residual data, with a particular maximum likelihood estimation model, to identify the data outliers in the time series network data.

In an eighth implementation, alone or in combination with one or more of the first through seventh implementations, the data quality threshold may include a threshold identifying a predetermined quantity of packets in the time series network data.

In a ninth implementation, alone or in combination with one or more of the first through eighth implementations, the network data may include data identifying a plurality of device identifiers associated with the plurality of network devices; an internal to external source bandwidth of the network; an external to internal destination bandwidth of the network; a total bandwidth of the network associated with one or more of a hypertext transfer protocol (HTTP), a domain name system (DNS), a server message block (SMB), a file transfer protocol (FTP), a remote desktop protocol (RDP), a secure sockets layer (SSL), or a secure shell (SSH) protocol; a total quantity of one or more of HTTP sessions, DNS sessions, SMB sessions, FTP sessions, RDP sessions, SSL sessions, or SSH protocol sessions; and/or the like.

In a tenth implementation, alone or in combination with one or more of the first through ninth implementations, the anomaly detection platform may train the first model with historical network data and prior to receiving the network data, and may train the second model based on the historical network data and prior to receiving the network data.

In an eleventh implementation, alone or in combination with one or more of the first through tenth implementations, the anomaly may be associated with an internal to external source bandwidth of the network; an external to internal destination bandwidth of the network; a total bandwidth of the network associated with one or more of a hypertext transfer protocol (HTTP), a domain name system (DNS), a server message block (SMB), a file transfer protocol (FTP), a remote desktop protocol (RDP), a secure sockets layer (SSL), or a secure shell (SSH) protocol; and/or the like.

In a twelfth implementation, alone or in combination with one or more of the first through eleventh implementations, the second model may include a univariate anomaly model or a multivariate anomaly model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, network data associated with a network,
      wherein the network data includes one or more artificial packets, and
      wherein the network includes a plurality of network devices;
   processing, by the device, the network data to generate sequential sets of the network data;
   processing, by the device, the sequential sets of the network data, with a time series model, to generate time series network data;
   determining, by the device, whether the time series network data satisfies a data quality threshold;
   transforming, by the device and when the time series network data satisfies the data quality threshold, residual data in the time series network data to identify data outliers in the time series network data;
   removing, by the device, the data outliers from the time series network data to generate modified time series network data;
   processing, by the device, the modified time series network data, with a model, to generate a forecast data point;
   comparing, by the device, the forecast data point and an actual data point to determine whether an anomaly exists in the network; and
   performing, by the device, one or more actions based on determining whether the anomaly exists in the network.

2. The method of claim 1, wherein processing the network data to generate the sequential sets of the network data comprises:
   ordering the network data to generate sequential network data; and grouping the sequential network data into sets to generate the sequential sets of the network data.

3. The method of claim 1, further comprising:
receiving additional network data when the time series network data fails to satisfy the data quality threshold.

4. The method of claim 1, wherein performing the one or more actions comprises one or more of:
generating an alert when the anomaly exists in the network;
correlating the anomaly with other anomalies to identify malicious behavior in the network;
updating one or more firewall policies for the plurality of network devices based on the anomaly; or
retraining at least one of the time series model or the model based on determining whether the anomaly exists in the network.

5. The method of claim 1, wherein performing the one or more actions comprises one or more of:
dispatching a robot to service one of the plurality of network devices when the anomaly is associated with the one of the plurality of network devices;
providing an instruction to one of the plurality of network devices when the anomaly is associated with the one of the plurality of network devices; or
causing a technician to service one of the plurality of network devices when the anomaly is associated with the one of the plurality of network devices.

6. The method of claim 1, wherein receiving the network data associated with the network comprises:
receiving the network data from one or more sensors associated with the plurality of network devices.

7. The method of claim 1, wherein processing the sequential sets of the network data, with the time series model, to generate the time series network data comprises:
processing the sequential sets of the network data, with a Holt-Winter time series model and a Nelder-Mead parameter optimization model, to generate the time series network data.

8. A device, comprising:
one or more memories; and
one or more processors, communicatively coupled to the one or more memories, to:
receive network data associated with a network,
wherein the network data includes one or more artificial packets,
wherein the network includes a plurality of network devices, and
wherein the network data is received from one or more sensors associated with the plurality of network devices;
process the network data to generate sequential sets of the network data;
process the sequential sets of the network data, with a first model, to generate time series network data;
determine whether the time series network data satisfies a data quality threshold;
receive additional network data when the time series network data fails to satisfy the data quality threshold;
transform, when the time series network data satisfies the data quality threshold, residual data in the time series network data to identify data outliers in the time series network data;
remove the data outliers from the time series network data to generate modified time series network data;
process the modified time series network data, with a second model, to generate a forecast data point;
compare the forecast data point and an actual data point to determine whether an anomaly exists in the network; and
perform one or more actions based on determining whether the anomaly exists in the network.

9. The device of claim 8, wherein the one or more processors, when transforming the residual data in the time series network data to identify the data outliers in the time series network data, are to:
process the time series network data, with one of a Box-Cox residual transformation model or a maximum likelihood estimation model, to transform the residual data in the time series network data; and
process the transformed residual data, with a particular maximum likelihood estimation model, to identify the data outliers in the time series network data.

10. The device of claim 8, wherein the data quality threshold includes a threshold identifying a predetermined quantity of packets in the time series network data.

11. The device of claim 8, wherein the network data includes data identifying one or more of:
a plurality of device identifiers associated with the plurality of network devices,
an internal to external source bandwidth of the network,
an external to internal destination bandwidth of the network,
a total bandwidth of the network associated with one or more of a hypertext transfer protocol (HTTP), a domain name system (DNS), a server message block (SMB), a file transfer protocol (FTP), a remote desktop protocol (RDP), a secure sockets layer (SSL), or a secure shell (SSH) protocol, or
a total quantity of one or more of HTTP sessions, DNS sessions, SMB sessions, FTP sessions, RDP sessions, SSL sessions, or SSH protocol sessions.

12. The device of claim 8, wherein the one or more processors are further to:
train the first model with historical network data and prior to receiving the network data; and
train the second model based on the historical network data and prior to receiving the network data.

13. The device of claim 8, wherein the anomaly is associated with one or more of:
an internal to external source bandwidth of the network,
an external to internal destination bandwidth of the network, or
a total bandwidth of the network associated with one or more of a hypertext transfer protocol (HTTP), a domain name system (DNS), a server message block (SMB), a file transfer protocol (FTP), a remote desktop protocol (RDP), a secure sockets layer (SSL), or a secure shell (SSH) protocol.

14. The device of claim 8, wherein the second model includes a univariate anomaly model or a multivariate anomaly model.

15. A non-transitory computer-readable medium storing instructions, the instructions comprising:
one or more instructions that, when executed by one or more processors, cause the one or more processors to:
receive network data associated with a network,
wherein the network data includes one or more artificial packets, and
wherein the network includes a plurality of network devices;
order the network data to generate sequential network data;

group the sequential network data into sets to generate sequential sets of the network data;
process the sequential sets of the network data, with a first time series model, to generate time series network data,
   wherein the first time series model is trained with historical network data prior to receiving the network data;
determine whether the time series network data satisfies a data quality threshold;
transform, when the time series network data satisfies the data quality threshold, residual data in the time series network data to identify data outliers in the time series network data;
remove the data outliers from the time series network data to generate modified time series network data;
process the modified time series network data, with a second time series model, to generate a forecast data point,
   wherein the second time series model is trained based on the historical network data prior to receiving the network data;
compare the forecast data point and an actual data point to determine whether an anomaly exists in the network; and
perform one or more actions based on determining whether the anomaly exists in the network.

16. The non-transitory computer-readable medium of claim 15, wherein the instructions further comprise:
one or more instructions that, when executed by the one or more processors, cause the one or more processors to:
   receive additional network data when the time series network data fails to satisfy the data quality threshold.

17. The non-transitory computer-readable medium of claim 15, wherein the one or more instructions, that cause the one or more processors to perform the one or more actions, cause the one or more processors to one or more of:
generate an alert when the anomaly exists in the network;
correlate the anomaly with other anomalies to identify malicious behavior in the network;
update one or more firewall policies for the plurality of network devices based on the anomaly;
retrain the first time series model and the second time series model based on determining whether the anomaly exists in the network;
dispatch a robot to service one of the plurality of network devices when the anomaly is associated with the one of the plurality of network devices;
provide an instruction to one of the plurality of network devices when the anomaly is associated with the one of the plurality of network devices; or
cause a technician to service one of the plurality of network devices when the anomaly is associated with the one of the plurality of network devices.

18. The non-transitory computer-readable medium of claim 15, wherein the one or more instructions, that cause the one or more processors to process the sequential sets of the network data, with the first time series model, to generate the time series network data, cause the one or more processors to:
process the sequential sets of the network data, with a Holt-Winter time series model and a Nelder-Mead parameter optimization model, to generate the time series network data.

19. The non-transitory computer-readable medium of claim 15, wherein the one or more instructions, that cause the one or more processors to transform the residual data in the time series network data to identify the data outliers in the time series network data, cause the one or more processors to:
process the time series network data, with one of a Box-Cox residual transformation model or a maximum likelihood estimation model, to transform the residual data in the time series network data; and
process the transformed residual data, with a particular maximum likelihood estimation model, to identify the data outliers in the time series network data.

20. The non-transitory computer-readable medium of claim 15, wherein the anomaly is associated with one or more of:
an internal to external source bandwidth of the network,
an external to internal destination bandwidth of the network, or
a total bandwidth of the network associated with one or more of a hypertext transfer protocol (HTTP), a domain name system (DNS), a server message block (SMB), a file transfer protocol (FTP), a remote desktop protocol (RDP), a secure sockets layer (SSL), or a secure shell (SSH) protocol.

* * * * *